United States Patent [19]

Hsu

[11] Patent Number: 6,002,104
[45] Date of Patent: Dec. 14, 1999

[54] ELECTRIC ARC WELDER AND CONTROLLER THEREFOR

[75] Inventor: Christopher Hsu, Mentor, Ohio

[73] Assignee: Lincoln Global, Inc., Cleveland, Ohio

[21] Appl. No.: 09/062,091

[22] Filed: Apr. 17, 1998

[51] Int. Cl.$^6$ .................................................. B23K 9/095
[52] U.S. Cl. .................................. 219/130.5; 219/137 PS
[58] Field of Search ............................ 219/130.5, 108, 219/130.01, 130.1, 130.21, 130.31, 130.32, 130.33, 132, 137 PS, 130.51; 702/184

[56] References Cited

U.S. PATENT DOCUMENTS

| | | | |
|---|---|---|---|
| 3,657,511 | 4/1972 | Friedman et al. ........................ | 219/132 |
| 4,972,064 | 11/1990 | Stava . | |
| 4,973,814 | 11/1990 | Kojima et al. ........................... | 219/108 |
| 5,059,765 | 10/1991 | Laing ...................................... | 219/130.5 |
| 5,278,390 | 1/1994 | Blankenship . | |
| 5,349,157 | 9/1994 | Blankenship . | |
| 5,353,238 | 10/1994 | Neef et al. ............................... | 702/184 |
| 5,571,431 | 11/1996 | Lantieri et al. ........................ | 219/130.01 |
| 5,837,968 | 11/1998 | Rohrberg et al. ...................... | 219/130.1 |

OTHER PUBLICATIONS

"Frequently Asked Questions About Licensing Java"—Internet Article.
"What Is the Java Platform"—Internet Article.

*Primary Examiner*—Clifford C. Shaw
*Attorney, Agent, or Firm*—Vickers, Daniels & Young

[57] ABSTRACT

A microprocessor based controller with a JAVA virtual machine used to control a specific electric arc welder having a switching type power supply for creating a welding cycle with a real time current waveform constituting several control parameters by rapidly switching a D.C. current in a controlled fashion by a pulse width modulator, which controller displays a waveform generated on an electrically operated waveform screen; allowing manual adjustment of at least a portion of the waveform displayed on the waveform screen to generate a new waveform on the waveform screen; and, operating the pulse width modulator to cause the power supply to create a real time waveform corresponding to the new waveform to execute the control parameters by the electric arc welder.

51 Claims, 6 Drawing Sheets

ELECTRIC ARC WELDER AND CONTROLLER THEREFOR

The present invention relates to the art of electric arc welding with a welder having a power supply of the switching type and more particularly to an electric arc welder of this type combined with a novel and unique controller.

BACKGROUND OF INVENTION

Electric arc welding involves the movement of an electrode toward a workpiece while current is passed through the electrode and across an arc between the electrode and workpiece. Although some electric arc welders utilize a non-consumable electrode, most of the mass production arc welding involves an electrode which is consumed during the welding process whereby the electrode is melted by the arc and deposited on the workpiece. Thus, an arc welding process includes variable process characteristics, such as wire speed or electrode speed, gas composition, electrode diameter and workpiece metal. The actual electrical arc welding process at the production site takes into consideration these characteristics and involves a non-linear complex control system which determines the applicable metal transfer mode and the electrical parameters of the power supply performing the welding process. In order to achieve desirable results, a waveform is selected having several control parameters, which waveform is customized for the exact condition of each welding application. Thus, controlling arc welding has become an art which demands substantial knowledge and experience to select a waveform having several control parameters to produce an optimum welding process. A large number of controllers have been developed for use with electric arc welders that have real time current waveforms developed by welding engineers to optimize the welding process performed in the field. To accomplish this objective, a microprocessor based controller has been developed and is now used that allows an operator in the field to select one of many welding waveforms by merely using one of several overlays. This successful microprocessor based controller is illustrated in Blankenship U.S. Pat. No. 5,278,390 that is incorporated by reference herein. By using a known template for the controller, an operator selects a welding process having the desired control parameters especially developed for the process by a skilled welding engineer. This successful controller had a certain amount of adjustability in the field; however, such on-site adjustments were limited. Mass production use of arc welders has created a demand for the ability to conveniently adjust certain control parameters of the welding cycle in the field, especially when the welding process is continued over several hours as experienced when the electric arc welders are used for a robot application in industrial manufacturing procedures. Thus, there has been developed a need for a controller to be used with an electric arc welder, where the controller can process a desired waveform that is adjusted interactively at the manufacturing site.

INCORPORATION BY REFERENCE

The present invention relates to an improvement over the controller as generally disclosed in Blankenship U.S. Pat. No. 5,278,390, incorporated by reference herein as background information relating to the environment to which the invention is directed. In practice and under normal circumstances the controller of the present invention is used for controlling the waveform and monitoring the operating parameters of an electric arc welder utilizing a power supply of the switching type. These switching type power supplies control the real time current waveform by rapidly switching a D.C. current in a controlled fashion by a pulse width modulator, or other control device for creating a series of current pulses having duty cycles modulated to create the desired output current. Such switching power supplies are used extensively in arc welding and take such forms as an inverter, such as generally described in Blankenship U.S. Pat. No. 5,349,157, or a down chopper or other converter, as generally shown in Stava U.S. Pat. No. 4,972,064. These two patents are incorporated by reference herein to show types of switching power supplies wherein the current waveform used in a welding process is controlled by rapidly switching current pulses to the welder. Other types of switching power supplies could be used for creating a real time current waveform generator by the controller of the present invention. Indeed, a power supply where the waveform is controlled by an analog signal of a known waveform can be used in the present invention.

The present invention also utilizes a JAVA platform, which is well known software platform for delivering and running interactive, dynamic applets or applications, normally provided on a network computer system or from an Internet location. This well known software platform can be used on top of other operating systems and compiles byte codes which are not specific to any physical machine, but are machine instructions for a JAVA virtual machine run by a program written in JAVA language. A general description of this well known software platform is contained in articles entitled "What is the JAVA platform?" dated Mar. 23, 1998 and incorporated by reference herein. Other aspects of JAVA technology utilized by the present invention is contained in an article entitled "Frequently Asked Questions About Licensing JAVA" dated Mar. 23, 1998 and incorporated by reference herein. A vast number of publications and books are now available describing the implementation and use of JAVA technology in a JAVA virtual machine and this technology is well known to a person skilled in the art of controlling electric arc welders.

THE INVENTION

The present invention is primarily applicable to a microprocessor based controller for a specific arc welder having a switching type power supply for creating a welding cycle, with a real time current waveform constituting several control parameters by rapidly switching a D.C. current in a controlled fashion by a pulse width modulator and it will be described with respect to such switching type power supply. This controller can be used with various switching type power supplies normally used in electric arc welders; however, the disclosure shows a down chopper power supply for simplicity. In practice, an inverter type power supply having a waveform controlled by a pulse width modulator is controlled in accordance with the present invention. The microprocessor based controller includes means for displaying a waveform generated on an electrically operated waveform screen, such as a CRT. In this manner, the operator at the production site can view the actual waveform to be processed by the electric arc welder under the direction of a controller constructed in accordance with the present invention. Interactive means are employed for manually adjusting at least a portion of the waveform displayed on the waveform screen to generate a new waveform operating on the waveform screen and having the desired control parameters. Consequently, a prebuilt waveform is first displayed on the CRT, normally in a graph exhibiting current versus time. If it is desirable to change one of the control parameters, such as background current, peak current, current ramp, etc., a manual adjustment of the prebuilt waveform is performed manually and interactively on the waveform screen. In this manner, a new current waveform is exhibited on the waveform CRT screen. In accordance with somewhat standard practice, the pulse width modulator of the power supply is controlled in accordance with the newly created current waveform to cause the power supply itself to generate a welding cycle with the real time waveform corresponding to the new waveform on the waveform screen. The welder power supply executes the new control parameters exhibited as control parameters in the new waveform. In this manner, a desired waveform can be exhibited and used by the electric arc welder. If there is a need to change a control parameter of the exhibited waveform, the waveform itself is modified visually by the operator on site and then employed for control of the electric arc welder. This interactive changing of the waveform, as it is visually displayed on a waveform screen, is novel and is implemented by including a JAVA virtual machine with a welder control application program in JAVA language. The control program is dedicated to the specific electric arc welder combined with the controller. Thus, the consumer product of the present invention is an electric arc welder having a power supply with a microprocessor based controller that is driven by a stand alone application program in JAVA language. This concept is accomplished by using a JAVA virtual machine as part of the on site controller. This is a novel product resulting in an electric arc welding that is interactively manipulated to create a waveform for controlling the actual real time waveform of the welding process. The controller performs its functions through real time adjustment of the pulse width modulator used in the switching power supply driving the welder.

In accordance with another aspect of the invention, there is provided an electric arc welder, as defined above, which welder has a microprocessor with a JAVA virtual machine and controlled by at least one control application program in JAVA language. The program is dedicated to the particular welder being controlled. The microprocessor system includes hardware with a first interface for an interactive display screen and a second interface for a manual data entry device, such as mouse or keyboard, that is used interactively to change the waveform on the display screen preparatory to the waveform being implemented on a I/O data bus for outputting control parameters to the welder. The same I/O data bus is used to input operating parameters from the welder. In this manner, the electric welder of the present invention can be controlled by manual manipulation of the actual waveform to be used in the welding process preparatory to implementation of the welding process. As changes are required, certain control parameters can be adjusted on the display screen to merely change the shape of the waveform being displayed. When the operating parameters from the welder are inputted to the microprocessor of the controller, a separate "scope" application program in JAVA language can be selected and implemented by the controller. In this manner, the CRT of the controller is converted from a waveform editor to an oscilloscope display for reading parameters from the welder and for displaying these parameters as a soft oscilloscope on the face of the controller. The scope display uses a window separate and distinct from the window used for editing the waveform. The screen of the controller is used to display either the waveform processed by the waveform editor application program or the oscilloscope plots processed by the scope application program. Both programs are processed by the JAVA virtual machine which is a part of the welder. The application programs can be loaded into the virtual machine by a CD ROM that is loaded at the factory to program each of the welders preparatory to delivery. Of course, the physical media of distributing the JAVA object code from the welding manufacturer to the customer can take other forms such as a floppy diskette, E-mail, web page or down loading by a modem. If it is desired to change the operation program for the welders in the field, it is possible by using the present controller to periodically update the control application program and/or the scope application program of the welders by a new CD ROM or by an Internet feed.

In accordance with another aspect of the present invention, the controller displaying on its screen a waveform also includes a series of read out devices adjacent the waveform screen. A series of control parameters for the waveform can be displayed adjacent the waveform screen, as read out values. Thus, when the waveform is displayed on the waveform screen it contains a series of control parameters, some of which are recorded as read out values on the face of the controller adjacent the waveform screen. For instance, the peak current of the waveform would be displayed in an alpha numerical numbers on the face of the controller. As the waveform is modified interactively on the screen, the read out value is automatically changed accordingly. In addition, by adjusting one or more of the displayed control parameters is a read out device, the waveform itself is changed accordingly. In accordance with another aspect of the invention, the displayed control parameters, shown in the read out devices, have a corresponding lock control parameter means for manually locking the display control parameters at preselected read out values. In this manner, the waveform can not be adjusted to change the value of a control parameter locked out by this aspect of the invention. In accordance with another aspect of the controller, a first override is implemented for limiting the value of one or more of the control parameters. In other words, if maximum current of the welder is at a set point, the control program processing a given waveform will prevent adjustment, either interactively or by a read out device, of the current to a level above the set maximum level. The same concept can be used with a relational constraint wherein there is a fixed relationship of one control parameter to another control parameter. This fixed relationship is maintained. In this fashion, when one of the control parameters is adjusted, the other parameter is adjusted accordingly to maintain the set, fixed relationship. These are schemes utilized in accordance with the present invention to constrain the interactive manipulation of the waveform on the waveform screen or adjustment of the waveform through read out devices on the face of the controller.

In accordance with another aspect of the present invention, the JAVA virtual machine of the controller is provided with two or more application programs that are stand alone and can be selected by the operator who selects one or the other programs to be executed. The hardware of the controller includes a mouse or keyboard which latches onto certain points on the displayed waveform and allows the points to be moved or dragged in accordance with standard microprocessor operation.

The present invention provides a controller for graphically manipulating current waveforms of an arc welder in real time, preferably through use of JAVA technology. The invention also monitors the actual waveform of the welder by analyzing operating parameters and using measurable electrical signals, such as arc current and voltage, derivative signals, such as impedance, power and energy, and process modes of operation. By using the present invention, the operating signals or parameters from the welder itself can be used to display and apply impedance of the arc and instantaneous power of the arc. Average current and voltage are sampled at a fixed rate and the welding time and the accumulated energy are also capable of being displayed in real time. If the scope program is being employed, the output waveform created on the screen can be analyzed and numerical data can be displayed from various aspects of the displayed operating parameters. Other aspects of the actual operating condition of the welder can be displayed and analyzed by using the scope program of the present invention.

The primary object of the present invention is the provision of a controller for an electric arc welder, which controller allows manipulation of a waveform on a screen for the purpose of changing the waveform to be used to determine operation of a welder. Such controller is preferably implemented by a JAVA virtual machine.

Another object of the present invention is the provision of a controller, as defined above, which controller can read the operating parameters of the welder to display, as an oscilloscope plot, various operation parameters and derivation thereof indicative of the actual welding process being performed.

Yet another object of the present invention is the provision of an electric arc welder, which can be controlled by adjusting a displayed waveform to the desired waveform preparatory to use by the welder power supply. Preferably, this welder employs a JAVA virtual machine using an application program is in JAVA language and dedicated to the welder.

Still another primary object of the present invention is the provision of an arc welder which incorporates a JAVA virtual machine as a stand alone platform for software used in the controller of the welder. The JAVA virtual machine uses one or more operating application program in JAVA language at the welder itself. In the past, JAVA technology has not been used on stand alone welders for controlling the operation of the welder at the manufacturing site.

These and other objects and advantages will become apparent from the following description taken together with the accompanying drawings.

BRIEF DESCRIPTION OF THE DRAWING

FIG. 3 is a function block diagram of the control application program implemented in JAVA language and dedicated to a particular welder, which program is used to program the architecture shown in FIG. 1;

PREFERRED EMBODIMENT OF THE INVENTION

Figure 1:
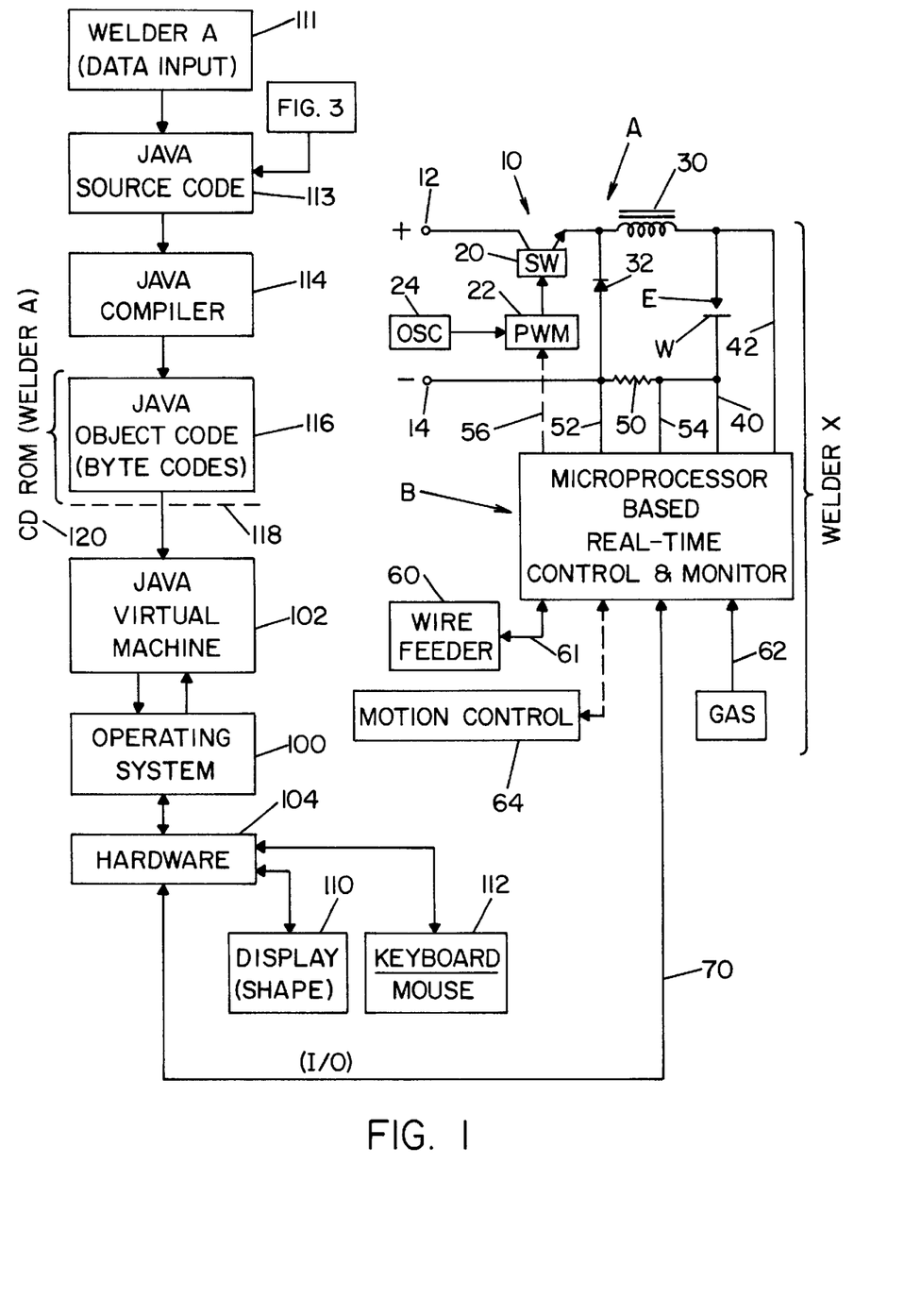
FIG. 1 is the control architecture of the preferred embodiment of the controller and dedicated electric arc welder with a stand alone implementation of JAVA technology.

Referring now to the drawings wherein the showings are for the purpose of illustrating the preferred embodiment of the present invention and not for the purpose of limiting same, FIG. 1 shows an electric arc welder A controlled by a somewhat standard microprocessor based controller B which, in accordance with the invention, is a real time control and monitor for welder A. Controller B is combined with the welder as a commercial product purchased for use in various welding processes, especially for mass production welding of consumer products, which welding is often done by a robot. The stand alone unit incorporating welder A and controller B uses any of a number of switching type power supplies, such as an inverter generally illustrated in Blankenship U.S. Pat. No. 5,349,157 or a converter or chopper as generally shown in Stava U.S. Pat. No. 4,952,064. For the purposes of simplicity, welder A is shown as a down chopper where the power supply 10 is used to switch a D.C. current at terminals 12, 14 in accordance with the operation of a switch 20. In practice, an inverter may use a plurality of switches or switches arranged in various configurations. A simplified switching type power supply utilizes switch 20 controlled by a pulse width modulator 22 driven at a pulse rate determined by oscillator 24, which pulse rate is normally 10 to 20 kHz and preferably approximately 20 kHz. Current pulses occur at a rapid rate and are directed through a relatively small inductor 30 to perform a welding process implemented between electrode E, normally in the form of an advancing welding wire, and workpiece W. The duty cycle of the various pulses of switch 20 is controlled by pulse width modulator 22 so that the waveform of the current in the welding process between electrode E and workpiece W is accurately controlled and repeated consistently. In accordance with standard practice, welder A has a freewheeling diode 32, an arc voltage sensor for creating a voltage across lines 40, 42 and a current shunt 50 for creating a voltage across lines 52, 54 representative of the arc current. The voltages across lines 40, 42 and lines 52, 54 are directed to the input of controller B for the purpose of monitoring the welding process, which process is controlled by the voltage on line 56 that changes in a real time fashion to follow the shape of a waveform governing the welding cycle of welder A. In accordance with standard practice, electrode E is an advancing welding wire represented as a wire feed device 60 having a speed controlled by and monitored by controller B as indicated by line 61. The welding process performed by welder A is modified according to the shielding gas employed in the welding process. The shielding gas is identified by data on line 62. When welder A is used for an automatic welding processes, such as robotic processes, the welding head is moved on a real time basis in accordance with a program in controller B that operates motion control device 64 in accordance with standard practice. The present invention relates to the control of welder A during the welding process and not necessarily to the individual control of the X, Y and Z motors used for adjusting the welding gun and the speed of the movement of the welding gun as schematically illustrated by motion control 64. As so far described, welder A is standard and controller B is a device well known in the art and known to manufacturers of electric arc welders having microprocessor based controllers. One such controllers is generally illustrated in Blankenship U.S. Pat. No. 5,278,390.

In accordance with the present invention, controller B is operated by the logic on I/O conduit or bus 70, which logic is the control parameters inputted into the controller. This same I/O bus outputs data or operating parameters from controller B. These control and operating parameters are processed in accordance with a software operating system 100 that may have any platform configuration with an overlay JAVA virtual machine 102. The virtual machine loaded with one or more JAVA application programs for performing the waveform editing or soft oscilloscope functions of the invention, as hereinafter described. Hardware 104 interacts with display 110 and is controlled by manual data entry device 112 in the form of a keyboard or mouse. As so far described, the total product of welder A and controller B, with real time control and monitoring of the welder by JAVA technology, is novel in the arc welding field. Waveforms exhibited on interactive display 110 are modified by manual data entry device 112 to create a new waveform to generate the desired control parameters on I/O bus 70 for real time control of the welding process between electrode E and workpiece W. When the "scope" or oscilloscope application program in JAVA language loaded into virtual machine 102 is executed, the control parameters continue to control the welding process in accordance with the final waveform; however, visual display 110 plots the real time operating parameters of the welding process. Thus, controller B monitors the ongoing welding process dictated by waveform ultimated selected by the control application program loaded in virtual machine 102. In practice, display 110 and manual data entry device 112 are adjacent welder A; however, I/O bus 70 can be a remote communication line without departing from the intended spirit and scope of the present invention.

Figures 3, 8:
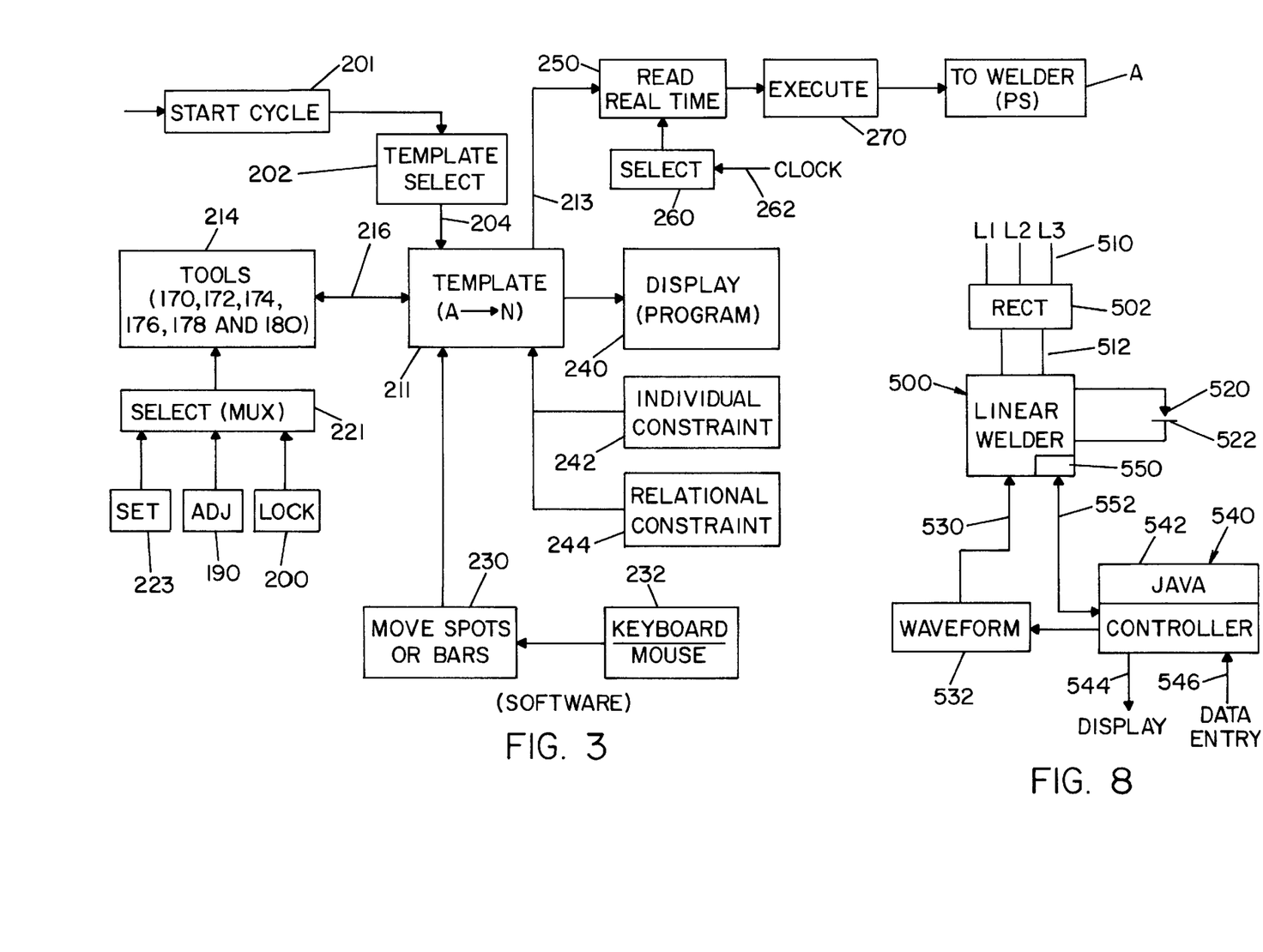

In accordance with the invention, virtual machine 102 is provided with program tailored specifically to welder A, so data input indicated by block 111 relates to welder A and is converted to JAVA source mode, as indicated by block 113. The control program shown in FIG. 3 is also in JAVA language whereby the JAVA source code of the control program and the data specific to welder A are compiled and converted into byte codes as indicated at block 116. This programming procedure is well known in the art and can be accomplished by persons in the welding industry to create a stand alone welder and controller having a JAVA virtual machine for implementing the unique control program to which the present invention is directed. Compiler 114 compiles byte codes at block 116 for use by virtual machine 102. Blocks 111, 113, 114 and 116 can be a CD ROM separate from welder A as shown by line 118. The CD ROM for the particular welder A is preferred; however, a tape or telephone line could be used to load application programs into virtual machine 102. In accordance with the invention, welder A and controller B are commercial products, sold in the welding industry as a stand alone unit which is programmed by an appropriate device, in practice a CD ROM containing byte codes for application programs in JAVA language, such as an operating program illustrated in FIG. 3, a scope program illustrated in FIG. 4 or other programs for implementation by dedicated welder A.

Figure 2:
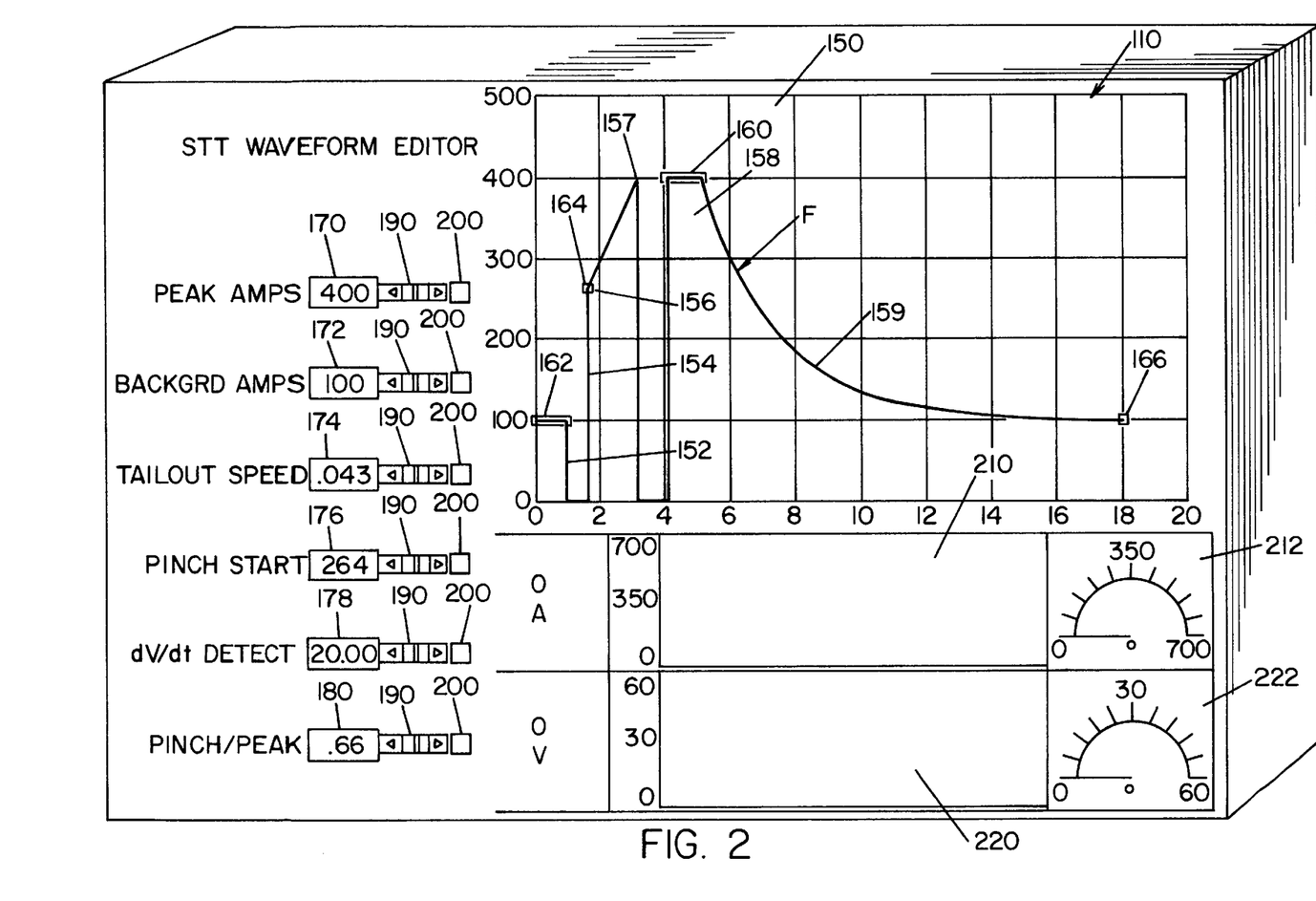
FIG. 2 is a front view of the CRT screen showing the waveform and other visual devices when the controller is used to implement the control application program aspect of the present invention.

Operation of controller B to implement the control application program is illustrated in FIGS. 2 and 3. FIG. 2 shows interactive display 110 used for editing a waveform F to be used to generate the control parameters used for operation of the power supply of welder A to duplicate waveform F. Visually displayed on waveform screen 150 of interactive display 110 is waveform F. This waveform is processed by welder A. The illustrated waveform is a short circuit welding operation similar to the welding process disclosed in Stava U.S. Pat. No. 4,972,064 where a short between the molten metal ball on electrode E and workpiece W is detected by a drop in voltage at 152. Then, the current is allowed to flow through the shorted metal, as indicated by line 154. An electrical pinch start at point 156, which is shown as 264 amperes. At point 157 a dv/dt detect indicates an imminent rupture of the fuse (short). The current is then turned off for a short period of time and is then allowed to have a plasma boost 158 with a tailed out along curve 159 awaiting the next short of the molten ball created by the arc of plasma after the fuse. Waveform F is representative in nature and is used by controller B to operate pulse width modulator 22 to follow waveform F during the welding process. Other waveforms on screen 150 can be implemented by welder A in the same manner.

In accordance with the invention, waveform F has a prebuilt or initial configuration when it is initially displayed on screen 150 of interactive display 110. The displayed waveform has certain portions which can be interactively moved. In this particular waveform, the peak current of the plasma boost is represented by a vertically movable bar 160. Background current of waveform W also has a vertically movable bar 162. Manual data entry device 112 allows an operator to select either of these bars by a mouse or keyboard and move the bars up or down. This action changes waveform F from the original prebuilt template by changing the current levels of the peak current 160 or the background current 162. In this particular example, waveform W also has two movable points 164 and 166 which can be moved vertically and horizontally, respectively. By interactively moving point 164, the current starting point for the pinch current is changed. In a like manner, moving point 166 left or right changes the tail out 159 of waveform F. Manipulation by a mouse to change either the level of bars 160, 162 or points 164, 166 modifies waveform F before the waveform is implemented in real time by controller B at welder A. Another waveform used for a different welding process would have different spots to be moved or bars to be raised or lowered. By the present invention, a prebuilt template is initially displayed on screen 150. Then the waveform is modified by moving the bars and changing the points to produce a similar waveform with different control parameters modified to create the desired waveform for use in the real time operation at welder A. The present invention relates to the novel concept of displaying a waveform to be used by controller B to direct operation of welder A. As another novel feature, waveform is visually edited or modified by merely interactively moving points and bars on the waveform to change the control parameter directed to bus 70 for control of welder A.

In accordance with another aspect of the present invention interactive display 110 is provided with a number of read out devices or tools to also change control parameters of the displayed waveform F. In the illustrated embodiments the read out devices contain values given in alpha numerical numbers illustrated as peak amperes in read out device or window 170, background amperes in device or window 172, tail out speed in device or window 174, pinch start in device or window 176, dv/dt detect in device or window 178 and a relationship between the pinch current at point 164 and peak current bar 160 in device 180. Read out values in devices or windows 170, 172, 174, 176, 178 and 180 are the values for the displayed waveform F. As points 164, 166 are moved, the read out values change accordingly. The same is true of raising and lowering bars 160, 162. The tools or read out values in devices or windows 170, 172, 174, 176, 178 and 180 can be incrementally changed by associated scroll bars 190. If it is desired to lock a control parameter at a particular exhibited value in one of the devices or windows 170, 172, 174, 176, 178 and 180, the mouse activates a lock window 200 associated with the particular read out devices or tool. For instance, if the peak current is adjusted by scroll bar 190 to 400 amperes as is the maximum current desired for the waveform W, block 200 at window 170 is addressed by the mouse to lock the current at 400 amperes. The same operation is possible at the various tools. When a value displayed in a read out device or window 170, 172, 174, 176, 178 and 180 is a locked parameter, interactive manipulation of the points and bars on screen 150 cannot violate the constrictions of the set value in the read out device. As another feature of the present invention, interactive display 110 includes a graph 210 for a current plot together with an analog read out gauge 212. In a like manner, graph 220 plots the voltage level at the welding arc in a manner complying with analog read out gauge 222. As so far described, the present invention allows the implementation by welder A of waveform F. This waveform can be modified by a mouse or keyboard, subject to certain constraints at read out values 170, 172, 174, 176, 178 and 180, whereby the newly created or selectively modified waveform is implemented in a real time fashion by welder A.

The control application program in JAVA language is illustrated in functional blocks in FIG. 3 where the start cycle block 201 allows an operator or welding engineer to select a desired prebuilt template A, as indicated by blocks 202. Template A is loaded by line 204 into template manipulation block 211. Control parameters are directed from template manipulation block 211 through line 213 for control of the welding process at welder A in accordance with the actual template displayed on screen 150, as shown in FIG. 2. This is the control function of controller B, where welder A has a welding process determined by the ultimate waveform in block 211. As will be described later, when controller B is in the monitoring mode, a "scope" application program is implemented by virtual machine 102. When this monitor function is being implemented, the final controlling waveform is in a background window not visible on screen 150 of display 110. Read out value in devices or windows 170, 172, 174, 176, 178 and 180 are finctionally manipulated as indicated by block 214 to changes the displayed read out values according to displayed waveform F. Block 214 is used to modify waveform F as previously described. Functional manipulation of waveform F by block 214 is input data on input/output line 216. Read out devices or windows 170, 172, 174, 176, 178 and 180 are multiplexed by multiplexer 221 so that the set value can be changed by entering an alpha numerical number as indicated by block 223. The scroll bar and control parameter locking device are operated by addressing the windows 190, 200, as previously described. Function block 230 indicates that spots or bars forming portions of waveform F can be moved by the data entry device 112, using finctional program 232. Waveform F is reconstructed into the desired final configuration by action of manipulation subroutine of block 211 using information, or data, on line 216 and the interactive adjustment from functional subroutine 230. Values for windows 170, 172, 174, 176, 178 and 180 are outputted from block 211 on line 216.

Block 240 is the program for displaying the present waveform F, which has been edited or modified from an original waveform A to a new waveform N by the subroutine of block 211. Controller B executes the data or control parameters comprising the new waveform F. As indicated by functional block 242, a subroutine is provided wherein values of block 214 and movement of spots and bars by function subroutine of block 230 cannot change certain parameters of the waveform. For instance, background current 162 could not be greater than pinch start current 164. Such constraints are applied to functional block 211 for constricting manual manipulation as changes by read out devices 170, 172, 174, 176, 178 and 180 of waveform F. As indicated in the subroutine or functional subroutine 244, there are certain relational constraints which are also applied to certain control parameters. For instance, if the ratio in read out device or window 180 is locked at a set point, adjustment of the pinch current 156 will correspondingly adjust the peak current 160. The constraint subroutines indicated by functional blocks 242 and 244 are merely added program features used in the manual implementation of waveform F to a desired waveform for execution by welder A. As previously indicated, control parameters are directed to the welder A by line 213. Control parameters are read in real time, as indicated by functional block 250. The particular parameter being read and outputted, or executed, at any given time is selected in a sequence as indicated by functional block 260 at a rate determined by the rate of pulses on line 262. Executive program of block 270 executes the control parameters to duplicate waveform F as the welding process through controlling pulse width modulator 22 in accordance with standard switching technology.

Figure 4:
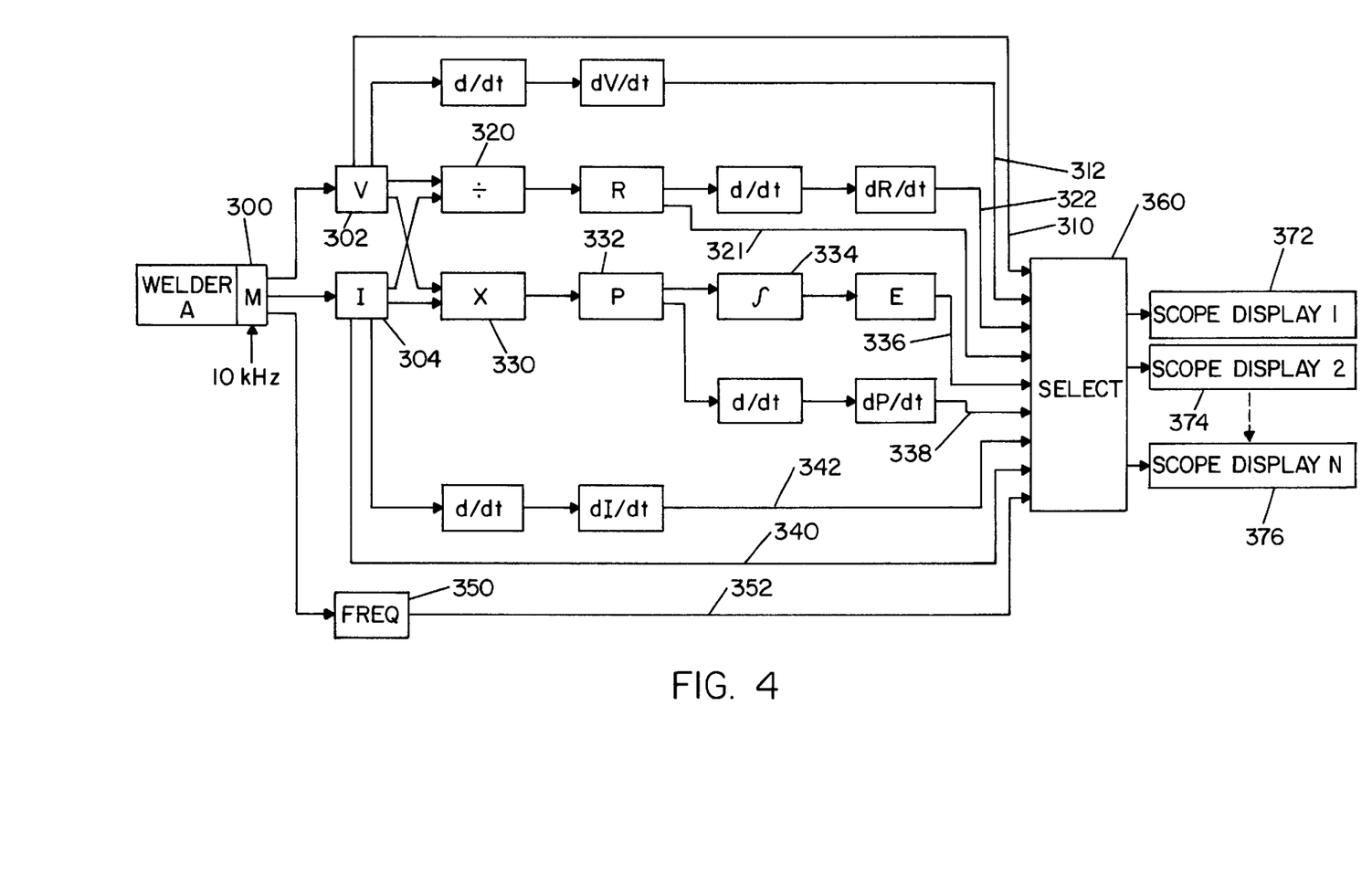
FIG. 4 is a block diagram showing the procedure used in outputting the welder operating parameters when the scope application program is implemented.
Figure 5:
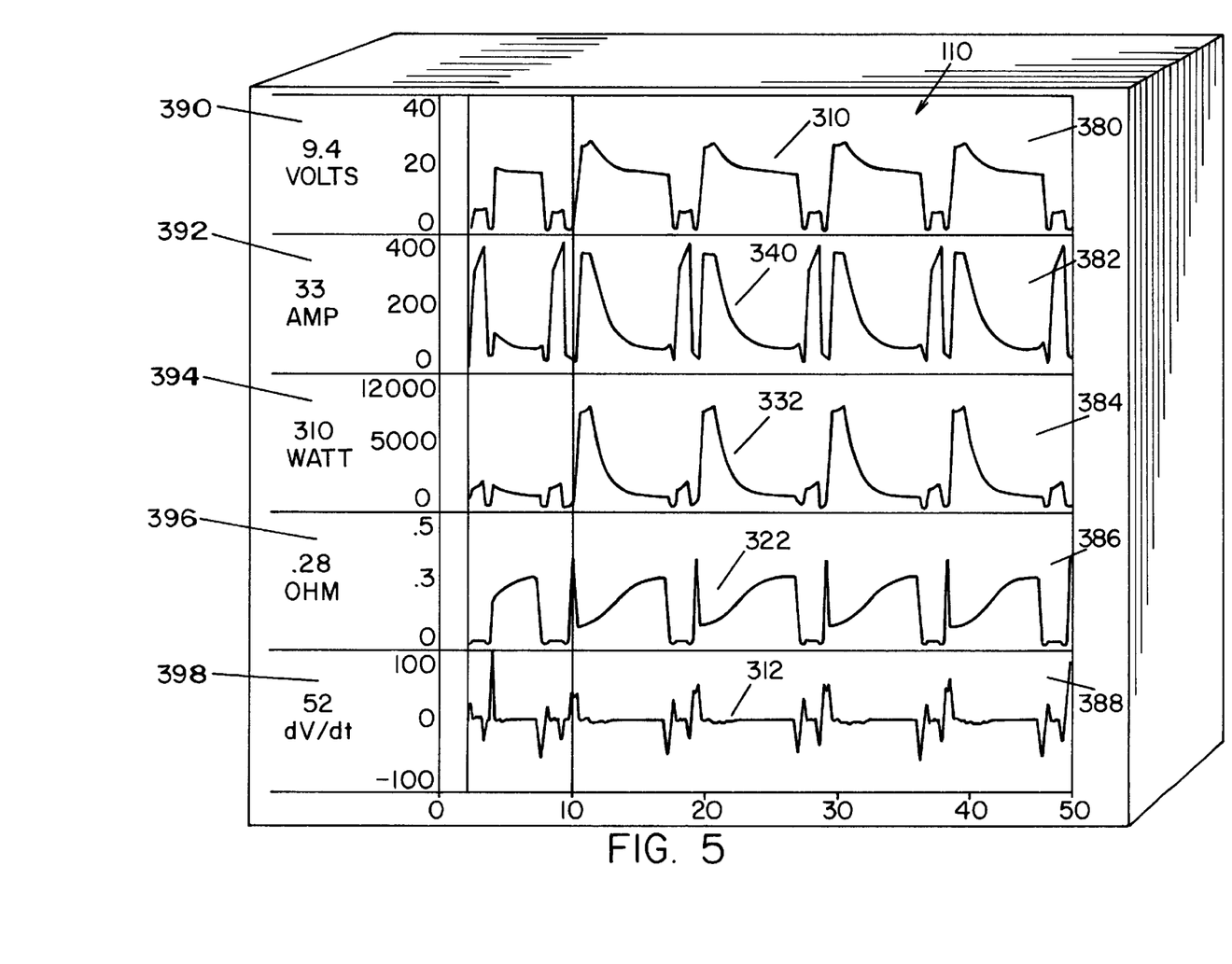
FIG. 5 is the front screen of the controller when the scope application program is being implemented with certain operating parameters combined to produce a variety of oscilloscope plots and values.

The primary aspect of the present invention is in controlling the waveform of the welding process in accordance with a manipulation of the waveform on an interactive screen 150 by use of values entered into the controller at the face of the waveform screen, as well as by manipulation of portions of the waveform displayed on the screen to generate a new waveform to be processed by welder A. In accordance with another aspect of the invention, controller B can function as a monitoring device in the form of an oscilloscope without additional sensors, probes or special I/O boards or special digital to analog converters. This aspect of the invention monitors the operating parameters of the process being performed by welder A. Data in the memory of the welder is sampled by implementing of a "scope" application program in JAVA language. Conventional signals, such as arc current and arc voltage, are sampled at a selected rate, such as 10 kHz and read as data blocks and plotted on screen 110 in real time. The functional aspects of the "scope" application program in JAVA language is illustrated as blocks in FIG. 4. This program exhibits selected operating parameters on interactive display screen 110 as shown in FIG. 5. Memory 300 of welder A is integrated periodically at a rate, such as 10 kHz, to produce data block samples of the voltage and current of welder A. These data blocks are loaded as voltage and current values into blocks 302, 304, respectively. From these two stored real time digital samples, the "scope" application program in JAVA language calculates various operating parameters that can be monitored by controller B. In the preferred embodiment, arc voltage is outputted on line 310. Line 312 contains the first derivative of voltage. Dividing voltage by current, as indicated by functional block 320, determines the effective resistance across the arc between electrode E and workpiece W measured in real time. This operating parameter is contained on line 321 as a digital word and its differential is applied on line 322 as a digital word. By multiplying the current and voltage from blocks 302, 304, as indicated by functional block 330, power, as a digital word, is obtained, as indicated by functional block 332. Integration block 334 directs a digital value indicative of energy to line 336. In a like manner, differentiation of the power provides a digital word on line 338. The arc current itself is outputted as a digital word on line 340. The differential of the arc current is outputted as a word on line 342. In accordance with the preferred embodiment of the present invention, the operating frequency of the welder is also outputted as indicated by functional block 350 to give in line 352 a digital number, or word, representing frequency of welder A. The digital values or words inputted into select subroutine 360 are outputted as either numbers or as scope displays as indicated by finctional blocks 372, 374 and 376. As shown in FIG. 5, oscilloscope displays 380, 382, 384, 386 and 388 provide real time plots of the operating parameters outputted on bus 70, as shown in FIG. 1. The value of these parameters is exhibited as numerical values in windows 390, 392, 394, 396 and 396. By implementing the "scope" application program, a variety of operating parameters can be exhibited in a real time on interactive display 110. During implementation of the "scope" application program, the control application program is also being run without actual display. The waveform is in a background window at all times.

Figure 6:
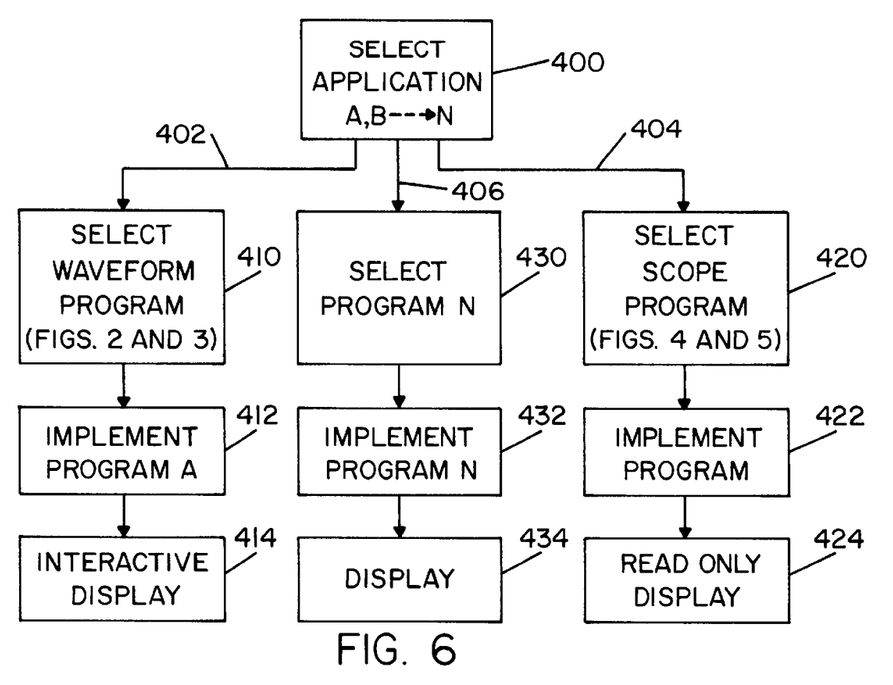
FIG. 6 is a functional block diagram showing the implementation of an application select feature of the invention where one of several application programs in JAVA language is selected by an operator to convert the controller into one of several modes of operation two of which are shown in FIGS. 3 and 4.

In the virtual machine 102 a number of application programs in JAVA language could be loaded for selection and implication. As illustrated in FIG. 6, the basic program of the present invention is the "waveform" program, which is selected by an operator when it is determined that the "waveform" or control application program is to be executed. This is indicated by a functional block 400, which allows an operator to select a program by the keyboard or other data entry mechanism. Lines 402, 404 and 406 indicate which program has been selected by the operator. At all times the waveform program is being implemented by a signal in line 402, which selects background "waveform" program, as indicated by functional block 410. This program is implemented to control welder A, as indicated by finctional block 412. This activates interactive display 414 in accordance with the control application program. If another program is selected, as indicated by lines 404 and 406, the waveform program merely becomes background and is overprinted on the interactive display by the new program, such as the "scope" application program shown in FIGS. 4 and 5. The "scope" application program overlays the "waveform" application program when the "scope" program is selected, as indicated by functional block 420. In practice, when the waveform program and the scope program are both selected, display device 110 has two visible windows displayed simultaneously at spaced locations. Functional block 422 implements the "scope" program which employs a read only display, as indicated by functional block 424. A third application program could be selected, as indicated by line 406, and functional block 430. This third program is implemented as indicated by functional block 432 and display 110 is activated in accordance with the type of program being executed. At this time, only two application programs are being implemented for use by welder A.

Figure 7:
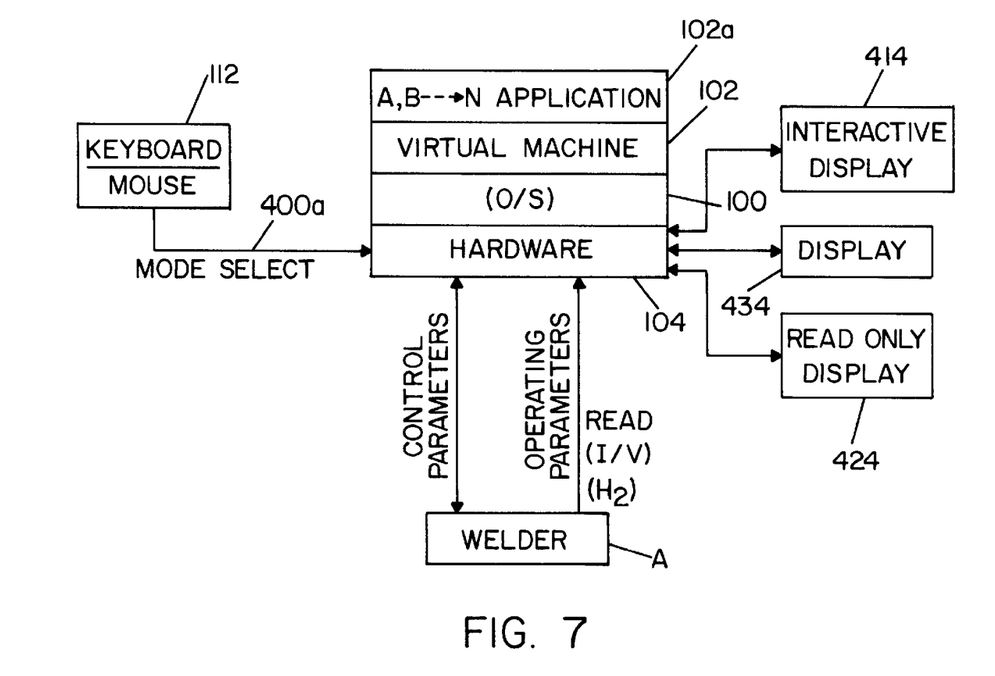
FIG. 7 is an overall architectural layout of the preferred embodiment of the present invention, wherein a welder is controlled by a microprocessor based controller utilizing a JAVA virtual machine programmed with one or more selectable application programs and having a data entry device, as well as specific display windows for each of the selected application programs; and, FIG. 8 is a block diagram showing the use of the present invention with a linear welder often used in speciality industries.

FIG. 7 shows the general architecture employed in practice of the present invention. Subroutines of functional blocks 414, 424 and 434 control interactive display used by the various application programs loaded into virtual machine 102, as indicated by application block 102a. The mode select indicated by lines 400a, selects the program in block 102a for controlling operation of welder A or monitoring of welder A, as so far described. The present invention is a stand alone electric arc welder and controller B capable of accomplishing the present invention. Since JAVA language is used, the operating system 100 employed in the controller is not a limiting component. The program is written specifically for welder A can be run on various software platforms. The present invention is the first time that an arc welder is modified to perform various functions by merely using different application programs written in JAVA language. By using the JAVA language, which is object coded, various functions of the present invention can be effectively implemented. The present invention allows graphical manipulation of the current waveform F for use in controlling an arc welder in real time by use of JAVA technology. The invention can monitor and analyze actual waveforms, while also maintaining control over critical welding parameters. The invention allows welding engineers to obtain the desired results by creating control parameter from a created waveform that can be customized for each application of the welder. This is done without use of tabular form or command-line interface controls. The invention can also be utilized for computing and plotting derivation signals as shown in FIGS. 4 and 5. This is extremely beneficial since it includes information on the impedance of the arc and the instantaneous power of the arc. In addition, the behavior of adaptive loops of the power source are also sampled and displayed. The arc length or wire extension can be locked or held constant by the power source in an adaptive loop using the present invention. By measuring the frequency of the pulses in the waveform, the starting frequency in a short arc or surface tension transfer process can also be calculated and displayed in real time using the present invention. The current and voltage are sampled at a fixed rate and the accumulated energy is displayed in a real time basis. All of these advantages are obtained by use of the present invention.

In practice, the invention is primarily used for mass production arc welders of the switching type, where an analog voltage control signal, like the signal on line 56 of the embodiment shown in FIG. 1, controls the real time waveform of the welder. However, the invention can be used in other welders where real time waveform is created under the direction of the analog voltage on a waveform control line. For instance, in FIG. 8 a linear welder 500 has a standard input rectifier 502 for converting three phase power supply 510 to a D.C. current link 512 for providing power to a welding process performed across electrode 520 and workpiece 522. The waveform at the arc between the electrode and workpiece has a waveform following the analog voltage on line 530 from a waveform shaper 532 operated under the control of a microprocessor based controller 540, with a JAVA virtual machine 542, interactive display 544 and data entry device 546. Controller 540 operates like controller B to output a desired waveform on line 530 and to input operating parameters from memory 550 of the welder on data line 552 to the novel controller 540.

Having thus defined the invention, the following is claimed:

1. In a microprocessor based controller for a specific electric arc welder having a switching type power supply for creating a welding cycle with a real time current waveform constituting several control parameters by rapidly switching a D.C. current in a controlled fashion by a pulse width modulator, the improvement comprising: means for displaying a waveform generated on an electrically operated waveform screen; interactive means for manually adjusting at least a portion of said waveform displayed on said waveform screen to generate a new waveform on said waveform screen; and, means for operating said pulse width modulator to cause said power supply to create a real time waveform corresponding to said new waveform to execute said control parameters.

2. The improved controller defined in claim 1 including a series of read out means adjacent said waveform screen for displaying a series of said control parameters of said waveform displayed adjacent said waveform screen as read out values.

3. The improved controller defined in claim 2 including means for manually adjusting one or more of said series of displayed control parameters and means for changing said waveform displayed on said waveform screen to depict a new waveform having said adjusted displayed control parameter and said corresponding read out value.

4. The improved controller as defined in claim 3 including lock control parameter means for manually locking one or more of said series of displayed control parameters at a selected read out value and means for preventing said displayed waveform to be changed from said read out value of said locked control parameter.

5. The improved controller as defined in claim 3 including a JAVA virtual machine with a welder control application program in JAVA language and dedicated to said specific electric arc welder.

6. The improved controller as defined in claim 2 including lock control parameter means for manually locking one or more of said series of displayed control parameters at a selected read out value and means for preventing said displayed waveform to be changed from said read out value of said locked control parameter.

7. The improved controller as defined in claim 6 including a JAVA virtual machine with a welder control application program in JAVA language and dedicated to said specific electric arc welder.

8. The improved controller as defined in claim 2 including a JAVA virtual machine with a welder control application program in JAVA language and dedicated to said specific electric arc welder.

9. The improved controller as defined in claim 8 wherein said interactive means is a mouse.

10. The improved controller as defined in claim 8 including means for actuating said pulse width modulator at a rate of at least about 20 kHz.

11. The improved controller as defined in claim 1 including a JAVA virtual machine with a welder control application program in JAVA language and dedicated to said specific electric arc welder.

12. The improved controller as defined in claim 11 wherein said interactive means is a mouse.

13. The improved controller as defined in claim 11 including means for actuating said pulse width modulator at a rate of at least about 20 kHz.

14. The improved controller as defined in claim 11 including a memory for storing the real time operating parameters of said specific electric arc welder as it is implementing said waveform displayed on said waveform screen; means for selecting a scope application program in JAVA language and dedicated to said specific electric arc welder; means responsive to said selection for shifting, reducing or replacing said waveform screen with a scope screen; and means for plotting said real time operating parameter from said memory on said scope screen.

15. The improvement as defined in claim 14 wherein said operating parameters include at least arc current and arc voltage.

16. The improved controller as defined in claim 1 wherein said interactive means is a mouse.

17. The improved controller as defined in claim 1 including first override means for limiting the value of one or more of said control parameters.

18. The improved controller as defined in claim 17 including second override means for fixing the relationship of one control parameter to another control parameter.

19. The improved controller as defined in claim 18 including a JAVA virtual machine with a welder control application program in JAVA language and dedicated to said specific electric arc welder.

20. The improved controller as defined in claim 17 including a JAVA virtual machine with a welder control application program in JAVA language and dedicated to said specific electric arc welder.

21. The improved controller as defined in claim 1 including means for actuating said pulse width modulator at a rate of at least about 20 kHz.

22. A method of operating a microprocessor based controller for a specific electric arc welder having a switching type power supply for creating a welding cycle with a real time current waveform constituting several control parameters by rapidly switching a D.C. current in a controlled fashion by a pulse width modulator, said method comprising the steps of:

(a) displaying a waveform generated on an electrically operated waveform screen;

(b) manually adjusting at least a portion of said waveform displayed on said waveform screen to generate a new waveform on said waveform screen; and, (c) operating said pulse width modulator to cause said power supply to create said real time waveform corresponding to said new waveform to execute said control parameters.

23. A method as defined in claim 22 including the additional step of:

(d) displaying a series of control parameters of said waveform displayed on said waveform screen as read out values adjacent said waveform screen.

24. A method as defined in claim 23 including the steps of:

(e) manually adjusting one or more of said series of displayed control parameters; and, (f) changing said waveform displayed on said waveform screen to depict a new waveform having said adjusted displayed control parameter and said corresponding read out value.

25. A method as defined in claim 24 including use of a JAVA virtual machine with a welder control application program in JAVA language and dedicated to said specific electric arc welder.

26. A method as defined in claim 23 including the steps of:

(e) providing a lock control parameter means for manually locking one or more of said series of displayed control parameters at a selected read out value; and, (f) preventing said new displayed waveform to be changed from said read out value of said locked control parameter.

27. A method as defined in claim 26 including use of a JAVA virtual machine with a welder control application program in JAVA language and dedicated to said specific electric arc welder.

28. A method as defined in claim 23 including use of a JAVA virtual machine with a welder control application program in JAVA language and dedicated to said specific electric arc welder.

29. A method as defined in claim 22 including use of a JAVA virtual machine with a welder control application program in JAVA language and dedicated to said specific electric arc welder.

30. A method as defined in claim 29 including the step of limiting the value of one or more of said control parameters.

31. A method as defined in claim 30 including the step of fixing the relationship of one control parameter to another control parameter.

32. A method as defined in claim 31 including use of a JAVA virtual machine with a welder control application program in JAVA language and dedicated to said specific electric arc welder.

33. A method as defined in claim 30 including use of a JAVA virtual machine with a welder control application program in JAVA language and dedicated to said specific electric arc welder.

34. A method as defined in claim 22 including the additional steps of:
   (d) providing a memory for storing the real time operating parameters of said specific electric arc welder as it is implementing said waveform displayed on said waveform screen;
   (e) selecting a scope application program in JAVA language and dedicated to said specific electric arc welder;
   (f) in response to said selection, shifting, reducing or replacing said waveform screen to display a scope screen; and,
   (g) plotting said real time operating parameter from said memory on said scope screen.

35. A method as defined in claim 34 wherein said operating parameters include at least arc current and arc voltage.

36. An electric arc welder having a switching type power supply for creating a welding cycle with a real time current waveform constituting several control parameters by rapidly switching a D.C. current in a controlled fashion by a pulse width modulator, said welder having a microprocessor with a JAVA virtual machine and controlled by at least one control application program in JAVA language and dedicated to said welder, said microprocessor including hardware with a first interface for an interactive display screen and a second interface for a manual data entry device and I/O means for outputting control parameters to said welder and inputting operation parameters from said welder.

37. An electric arc welder as defined in claim 36 including means for using said data entry device for constructing a waveform on said interactive screen and means for using said I/O means for controlling said pulse width modulator of said welder to cause said welder to perform a welding process using said displayed waveform.

38. A method of operating a welder having a switching type power supply for creating a welding cycle with a real time current waveform constituting several control parameters by rapidly switching a D.C. current in a controlled fashion by a pulse width modulator, said method comprising the steps of:
   (a) providing a microprocessor unit having a JAVA virtual machine and controlled by at least one control application program in JAVA language and dedicated to said welder;
   (b) controlling data displayed on an interactive display screen by signals from said microprocessor;
   (c) operating a data entry device to change data to change the data on said display screen;
   (d) creating control parameters by data displayed on said display screen;
   (e) controlling the operation of said pulse width modulator by said control parameters to create a current waveform at said welder; and,
   (f) reading operating parameters from said welder for display on said interactive display screen.

39. A method as defined in claim 38 wherein said data displayed on said interactive display screen is a desired waveform for said current waveform of said welder and change of data on said screen changes said displayed waveform and thereby said control parameters used to create said current waveform at said welder.

40. In a microprocessor based controller for a specific electric arc welder having a power supply for creating a welding cycle with a real time current waveform constituting several control parameters and determined by an analog voltage control signal tracing a desired waveform having said control parameters, the improvement comprising: means for displaying a waveform generated on an electrically operated waveform screen; interactive means for manually adjusting at least a portion of said waveform displayed on said waveform screen to generate a new waveform on said waveform screen; and, means for creating said analog control signal to create a real time waveform corresponding to said new waveform to execute said control parameters at said welder.

41. The improved controller as defined in claim 40 including a JAVA virtual machine with a welder control application program in JAVA language and dedicated to said specific electric arc welder.

42. The improved controller as defined in claim 41 including a memory for storing the real time operating parameters of said specific electric arc welder as it is implementing said waveform displayed on said waveform screen; means for selecting a scope application program in JAVA language and dedicated to said specific electric arc welder; means responsive to said selection for shifting, reducing or replacing said waveform screen with a scope screen; and means for plotting said real time operating parameter from said memory on said scope screen.

43. The improvement as defined in claim 42 wherein said operating parameters include at least arc current and arc voltage.

44. A method of operating a microprocessor based controller for a specific electric arc welder having a power supply for creating a welding cycle with a real time current waveform constituting several control parameters and determined by an analog voltage control signal tracing a desired waveform having said control parameters, said method comprising the steps of:
   (a) displaying a waveform generated on an electrically operated waveform screen;
   (b) manually adjusting at least a portion of said waveform displayed on said waveform screen to generate a new waveform on said waveform screen; and,
   (c) creating said analog control signal to cause said power supply to create said real time waveform corresponding to said new waveform to execute said control parameters.

45. A method as defined in claim 44 including use of a JAVA virtual machine with a welder control application program in JAVA language and dedicated to said specific electric arc welder.

46. A method as defined in claim 44 including the additional steps of:
   (d) providing a memory for storing the real time operating parameters of said specific electric arc welder as it is implementing said waveform displayed on said waveform screen;
   (e) selecting a scope application program in JAVA language and dedicated to said specific electric arc welder;
   (f) in response to said selection, shifting, reducing or replacing said waveform screen to display a scope screen; and,
   (g) plotting said real time operating parameter from said memory on said scope screen.

47. A method as defined in claim 46 wherein said operating parameters include at least arc current and arc voltage.

48. An electric arc welder having a power supply for creating a welding cycle with a real time current waveform constituting several control parameters by rapidly switching a D.C. current in a controlled fashion under the control of an analog signal tracing a desired waveform having said control parameters, said welder having a microprocessor with a JAVA virtual machine and controlled by at least one control application program in JAVA language and dedicated to said welder, said microprocessor including hardware with a first interface for an interactive display screen and a second interface for a manual data entry device and I/O means for outputting control parameters to said welder and inputting operation parameters from said welder.

49. An electric arc welder as defined in claim 48 including means for using said data entry device for constructing a waveform on said interactive screen and means for using said I/O means for controlling said analog control signal to cause said welder to perform a welding process using said displayed waveform.

50. A method of operating a welder having a power supply for creating a welding cycle with a real time current waveform constituting several control parameters by rapidly switching a D.C. current in a controlled fashion under the control of an analog signal tracing a desired waveform having said control parameters, said method comprising the steps of:
   (a) providing a microprocessor unit having a JAVA virtual machine and controlled by at least one control application program in JAVA language and dedicated to said welder;
   (b) controlling data displayed on an interactive display screen by signals from said microprocessor;
   (c) operating a data entry device to change data to change the data on said display screen;
   (d) creating control parameters by data displayed on said display screen;
   (e) creating said analog control signal with said control parameters to create a current waveform at said welder; and,
   (f) reading operating parameters from said welder for display on said interactive display screen.

51. A method as defined in claim 50 wherein said data displayed on said interactive display screen is a desired waveform for said current waveform of said welder and change of data on said screen changes said displayed waveform and thereby said control parameters used to create said current waveform at said welder.

* * * * *